(12) United States Patent
Paczkowski et al.

(10) Patent No.: US 9,043,928 B1
(45) Date of Patent: May 26, 2015

(54) ENABLING WEB PAGE TRACKING

(75) Inventors: Lyle W. Paczkowski, Mission Hills, KS (US); John E. Belser, Olathe, KS (US); Nicolas A. Nehme Antoun, Olathe, KS (US); Farni B. Weaver, Spring Hill, KS (US)

(73) Assignee: Sprint Communications L.P., Overland Park, KS (US)

( * ) Notice: Subject to any disclaimer, the term of this patent is extended or adjusted under 35 U.S.C. 154(b) by 855 days.

(21) Appl. No.: 12/711,902

(22) Filed: Feb. 24, 2010

(51) Int. Cl.
*G06F 7/04* (2006.01)
*H04L 29/06* (2006.01)
*G06F 21/00* (2013.01)
*G06F 21/41* (2013.01)
*G06F 21/45* (2013.01)

(52) U.S. Cl.
CPC .............. *H04L 63/10* (2013.01); *H04L 63/168* (2013.01); *G06F 21/00* (2013.01); *G06F 21/41* (2013.01); *G06F 21/45* (2013.01)

(58) Field of Classification Search
CPC ....... H04L 63/10; H04L 63/08; H04L 63/168; G06F 21/41; G06F 21/45; G06F 21/00; G06F 2221/2117
USPC ...................................... 726/26–30
See application file for complete search history.

(56) References Cited

U.S. PATENT DOCUMENTS

| | | | |
|---|---|---|---|
| 7,869,792 B1* | 1/2011 | Zhou et al. | 455/411 |
| 8,286,220 B2* | 10/2012 | Forristal | 726/1 |
| 8,812,532 B2* | 8/2014 | Skaf | 707/768 |
| 2002/0128925 A1* | 9/2002 | Angeles | 705/26 |
| 2003/0084294 A1* | 5/2003 | Aoshima et al. | 713/169 |
| 2004/0186883 A1* | 9/2004 | Nyman et al. | 709/203 |
| 2005/0170861 A1* | 8/2005 | Niemi et al. | 455/552.1 |
| 2007/0055783 A1* | 3/2007 | Gourraud | 709/227 |
| 2007/0061459 A1* | 3/2007 | Culbreth et al. | 709/225 |
| 2008/0201225 A1* | 8/2008 | Maharajh et al. | 705/14 |
| 2008/0320558 A1* | 12/2008 | Imanishi et al. | 726/2 |
| 2010/0005188 A1* | 1/2010 | Solis et al. | 709/232 |
| 2013/0254660 A1* | 9/2013 | Fujioka | 715/707 |
| 2014/0214668 A1* | 7/2014 | Lotter et al. | 705/41 |

OTHER PUBLICATIONS

"RFC 3265: Session Initiation Protocol (SIP)—Specific Event Notification," IEFT, Jun. 2002, 36 pages.*
Roach, A. B., "Session Initiation Protocol (SIP)—Specific Event Notification," RFC 3265, IETF, Jun. 2002, 36 pages.*

* cited by examiner

*Primary Examiner* — Mohammad A Siddiqi

(57) ABSTRACT

Methods are provided for tracking data corresponding to a mobile device that accesses a web page. Once a mobile device is registered with a network, the mobile device is instructed to request permission before accessing a web page. An access request is received, and based on a user profile, the access request is approved such that the mobile device may access the web page. Access data that corresponds to the mobile device accessing the web page is collected so that it can be added to and stored in a database.

19 Claims, 6 Drawing Sheets

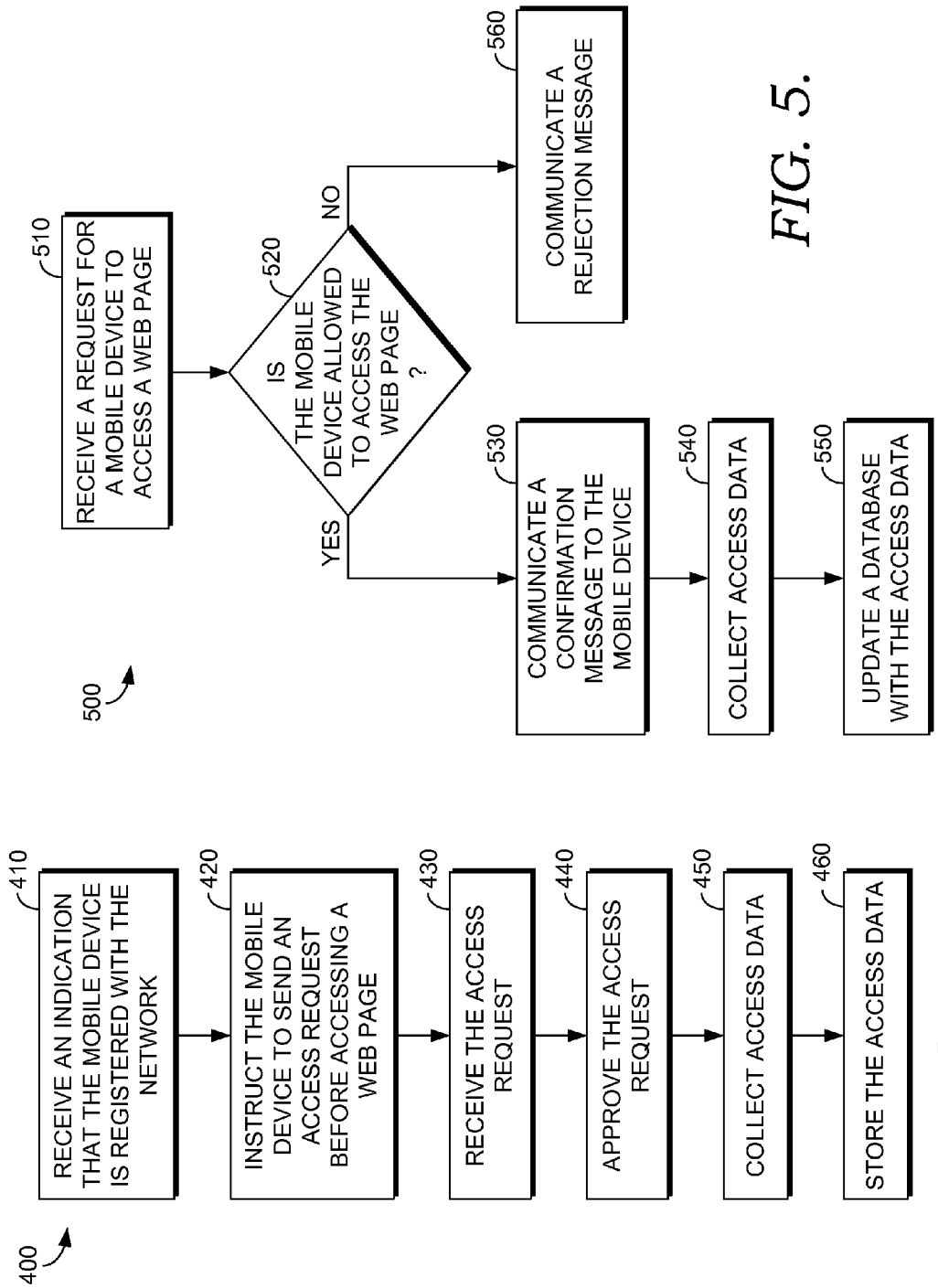

```
SUBSCRIBE sip:MAT@example.com SIP/2.0
To: <sip:MAT@example.com>
From: <sip:AS@example.com>;tag=78923
Date: Mon, 10 Jul 2000 03:55:06 GMT
Call-Id:1349882@AS.example.com
CSeq:4SUBSCRIBE
Contact:<sip:AS@example.com>
Event:web-app
Expires:3600
Accept: application/simple-message-summary+xml
Content-Length: 0
```

FIG. 7.

ENABLING WEB PAGE TRACKING

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media for tracking access data that corresponds to a mobile device accessing a web page. In one embodiment, an application server receives a registration notification indicating that a mobile device has registered with a network, such as an IMS network. The mobile device is instructed to alert the application server before attempting to access a web page. This allows the application server to collect information regarding the mobile device accessing the web page. This information may include the time and date that the web page was accessed by the mobile device, a succession of websites from which the web page was accessed, user information, etc. This information may be extended or offered to entities such as advertising agencies that personalize advertisements for users based on this information. Further, a database may be accessed so that the information can be entered into the database. The database may include a counter for each web page that is incrementally increased each time the web page is accessed by a user.

BRIEF DESCRIPTION OF THE SEVERAL VIEWS OF THE DRAWINGS

Illustrative embodiments of the present invention are described in detail below with reference to the attached drawing figures, wherein:

FIGS. 4-6 depict flowcharts of methods for tracking web page access information, in accordance with various embodiments of the present invention.

FIG. 7 depicts an illustrative message for use in connection with an embodiment.

DETAILED DESCRIPTION

Figure 1:
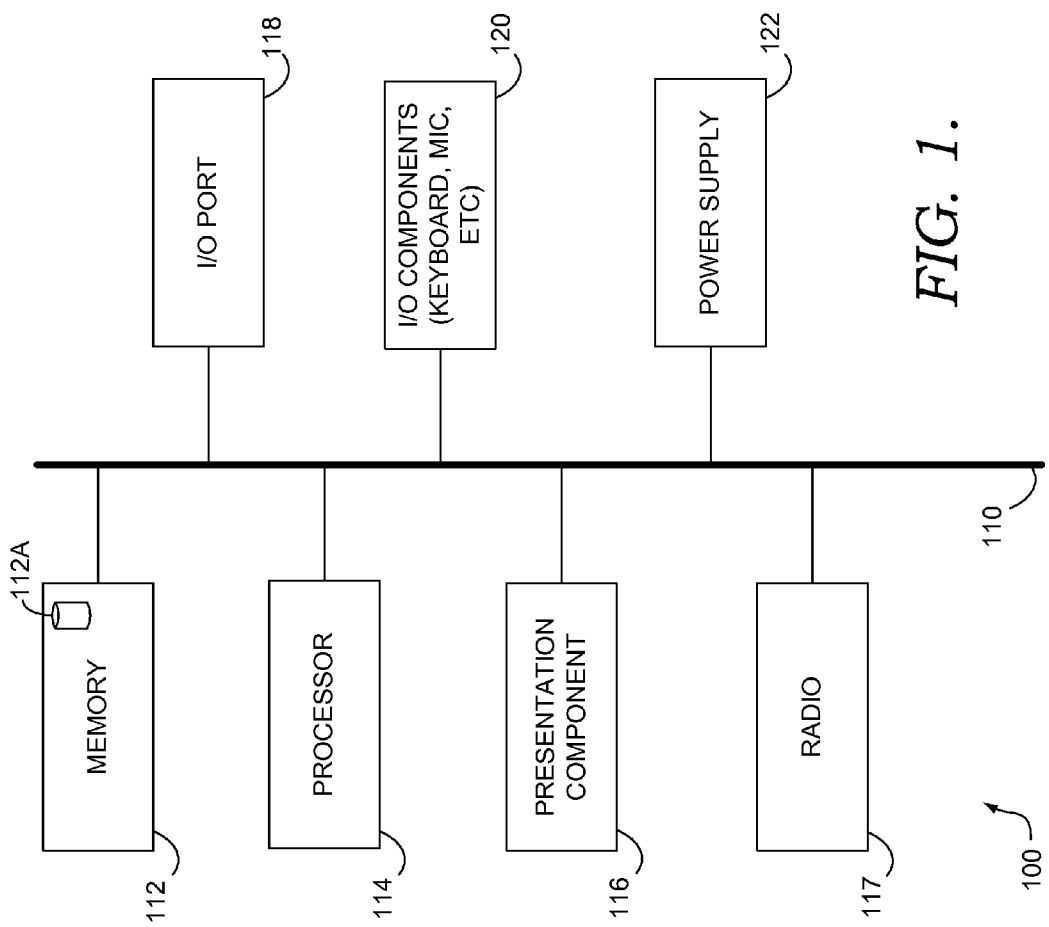
FIG. 1 depicts an illustrative device suitable for use in connection with an embodiment of the present invention.

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AAA Authentication, Authorization, and Accounting
    CALEA Communications Assistance for Law Enforcement Act
    CDMA Code Division Multiple Access
    CSCF Call Session Control Function
    GPRS General Packet Radio Service
    GSM Global System for Mobile communications (Groupe Spécial Mobile)
    HA Home Agent
    HSS Home Subscriber Server
    HTTP Hypertext Transfer Protocol
    IMEI International Mobile Equipment Identity
    IMS Internet Protocol Multimedia Subsystem
    IMSI International Mobile Subscriber Identity
    IP Internet Protocol
    ISC IMS Service Control
    LED Light Emitting Diode
    MRF Media Resource Function
    PDA Personal Data Assistant
    PDSN Packet Data Serving Node
    SIP Session Initiation Protocol
    TDMA Time Division Multiple Access
    UMTS Universal Mobile Telecommunications System
    XML Extensible Markup Language Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 is a radio that facilitates communication with a wireless telecommunications network. Illustrative wireless telecommunications technologies include CDMA, GPRS, TDMA, GSM, WIMAX, LTE, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
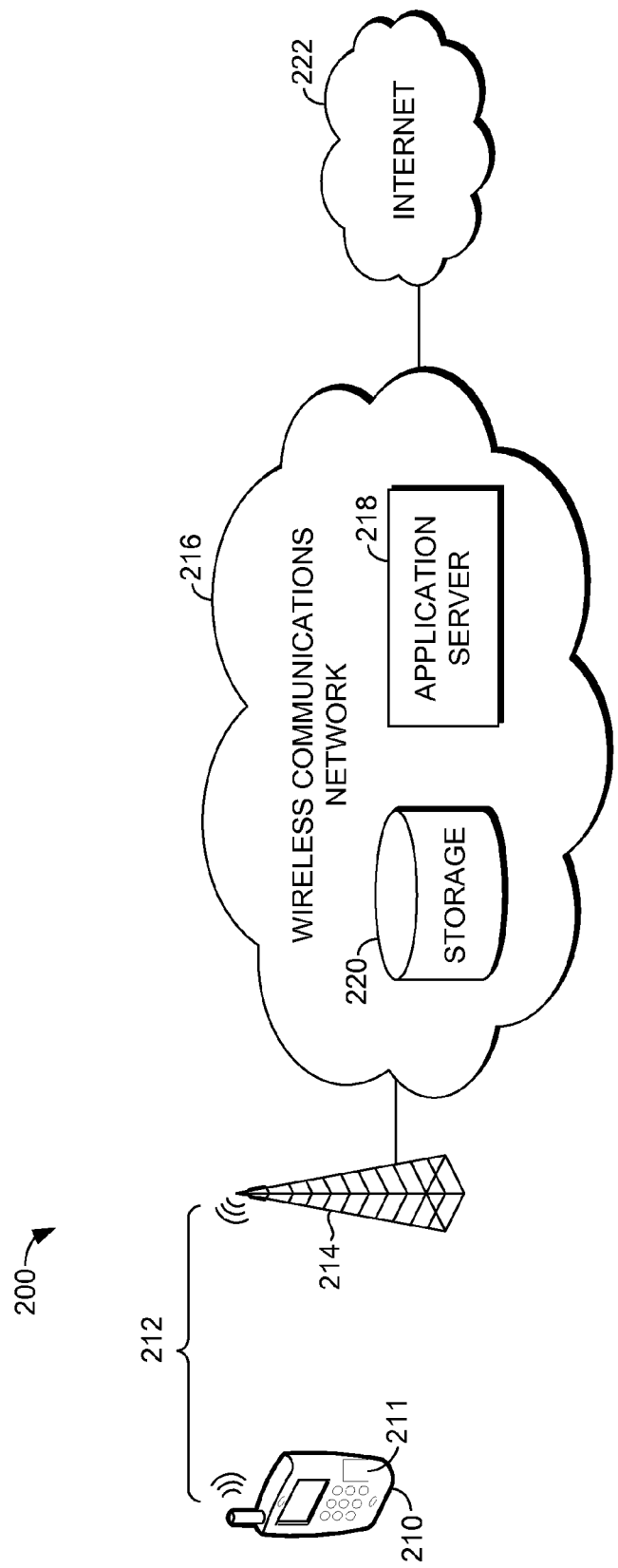
FIG. 2 depicts an illustrative operating environment suitable for practicing an embodiment of the present invention.

Turning now to FIG. 2, an illustrative operating environment is provided and referenced generally by the numeral 200, which depicts an illustrative networking environment that enables data associated with a mobile device accessing a web page to be tracked. Mobile device 210 is the type of device described in connection with FIG. 1 in one embodiment. It includes a client application 211 that helps carry out aspects of the technology described herein. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. In one embodiment, the client application 211 communicates registration messages to the wireless communications network 216 to register the mobile device 210, notifies an application server 218 prior to the mobile device 210 attempting to access a web page on the Internet 222, and communicates various confirmation messages to the application server 218.

Mobile device 210 communicates with a base transceiver station (BTS) 214 by way of a communications link 212. BTS 214 provides access to what some skilled artisans refer to as a wireless communications network, also termed a core network. We do not mean to imply that the item referred to in FIG. 2 by reference numeral 216 is the only form of a wireless communications network that is possible. To the contrary, not all components that make up wireless communications network 216 are shown, and some of the components that are shown as being within wireless communications network 216 do not need to be. Also, not all connections or possible connections are shown (such as, for example, between application server 218 and storage 220).

The wireless communications network 216 includes various components, some of which are not shown. An application server 218 and a storage 220 are illustrated in FIG. 2. In one embodiment, the application server 218 is connected to the storage 220 so that information stored in the storage 220 can be accessed and retrieved by the application server 218. The application server 218 serves many purposes. Generally, an application server hosts and executes services, and interfaces with a call-control component, such as a CSCF using Session Initiation Protocol (SIP). Other protocols may also be used in addition to SIP, and are contemplated to be within the scope of the present invention. In one embodiment, users associated with a particular service provider are provisioned on the application server 218 with a user profile that includes specific user preferences. These preferences may include website access lists, times and dates associated with restrictions on access to the websites (e.g., parental control settings), etc. Users may be provisioned when the user signs up for a service, such as a wireless communications service with a service provider. For instance, when a service provider activates a user's mobile device, the application server 218 may be provisioned with information associated with that user at that time. As such, the application server 218 may have an interface that is used to communicate information to and from provisioning elements of the service provider.

In another embodiment, the application server 218 has a web interface that allows a user to log in and modify preferences in the user profile. This may include setting or modifying parental control preferences (e.g., which websites can be accessed at a certain time of the day). The application server 218 may also include an application executable that is the master and that keeps track of all processing. In embodiments, the application server 218 has or is able to access one or more data stores, such as the storage 220. The data stores may be local or remote. One such data store may contain user profiles that are sent to the application server 218 or an associated data store when a user is provisioned. Another data store may be used to log website information, such as access data. For exemplary purposes only, access data may include one or more of how many times various users have accessed various web pages, the date and time of day that the web pages were accessed, from where the web pages were accessed (e.g., sequence of web pages from which the particular web page was accessed), and whether the application server 218 accepted or rejected the mobile device's 210 request to access the web page. This access data may be stored and later sold to an entity, such as an advertising agency, that may use the data to determine personalized advertisements to send to particular users. The data may also be used for statistical purposes.

In one instance, a reporting or historical log is kept by the data store to log elements that contain streams, such as one or more web pages from which the present web page was accessed. For instance, a user may have visited a web page associated with sports news, and may have accessed that web page through a national news web page, and may have accessed that web page through a search web page, and so on. This sequence of web pages is stored in a historical log, and may be used by various entities to determine how a particular web page is most often accessed. Further, a process counter may be used to keep track and monitor the number of times that a particular web page has been accessed. As such, each time a user accesses a particular web page and this information is communicated to the application server 218, the application server 218 can notify the process counter to increase its count by one for that particular web page. The process counter may be its own component within the wireless communications network 216, or may be integrated into the application server 218 or the storage 220. While one data store (storage 220) is illustrated in FIG. 2, it is contemplated to be within the scope of the present invention that more than one data store may be used to accomplish embodiments of the present invention described herein.

In embodiments, the access data can be sent to various law-enforcement agencies (e.g., CALEA). For example, some websites may be flagged as being directed to terrorists, abusers, attackers, etc. When a user accesses a flagged website, information (e.g., information about the user, the website) can be immediately sent to the appropriate law-enforcement agency. In one instance, a notification is triggered as soon as a flagged website is accessed. This may act as a real-time notification server. Further, the location of the user can be monitored, and this location information can also be sent to the appropriate law enforcement agency. In yet another embodiment, the application server 218 includes an IMS service control (ISC) interface that allows the ability to process and interpret ISC. Generally, an ISC interface is used to exchange messages between a call-control component (e.g., CSCF) and an application server. This interface is a standardized approach for a proxy to communicate with multiple application servers.

As mentioned, some components are not depicted on FIG. 2 so as to not obscure aspects of the various embodiments of the present invention. For instance, the wireless communications network 216 may include various components that are not shown. One of these components is a network-access gateway (not shown) that helps facilitate communication between mobile device 210 and other networks (not shown) as well as the Internet 222. The network-access gateway is also known by some skilled artisans as a packet data serving node (PDSN). Similarly, others might refer to this device as a foreign agent. The network-access gateway helps manage communications sessions between the mobile device 210 and other components, such as components of the wireless communications network 216 (such as those not shown). Any device that provides similar functionality is contemplated within the scope of this disclosure. For example, a GSM offers similar functionality in networks that utilize GSM or UMTS technology. At a high level, the network-access gateway helps provide access to the Internet as well as to other network technologies and application services. It helps provide mobile IP (MIP) access, one-agent support, and transportation of packets to facilitate the funneling or communicating of data through virtual private networks. It can act as a client for an authentication server (not shown), which helps ensure that mobile device 210 is authorized to communicate via the wireless telecommunications network. In some embodiments, the authentication server is known as an authentication, authorization, and accounting (AAA) server. But it can be any device that helps authenticate mobile device 210. In one embodiment, a network-access gateway includes a set of computer executable instructions that helps carry out various aspects of technology described herein.

Another component not depicted in FIG. 2 may include a radio network controller that often sits between BTS 214 and the network-access gateway, although its functionality can be subsumed into other elements. We have included a selection of components so as to not obscure more relevant aspects of the technology that we are describing. Further, a home agent (not shown) may be included in the embodiment of FIG. 2. A home agent is a router on the mobile device's 210 home network that maintains information about the device's current location, which, in one embodiment, is identified in a care-of-address. This allows the mobile device 210 to keep the same IP address even when it connects from a different location. In one instance, the home agent works in conjunction with a foreign agent.

Generally, in this disclosure, when we speak of communicating data or information we are referring to any action that requires mobile device 210 to have an IP address in order to carry out some action. Mobile device 210 might attempt to access items such as the Internet 222 as well as other components that might alone or in combination facilitate things such as television reception, e-mail reception, picture mail, video mail, video conferencing, and the like.

Figure 3:
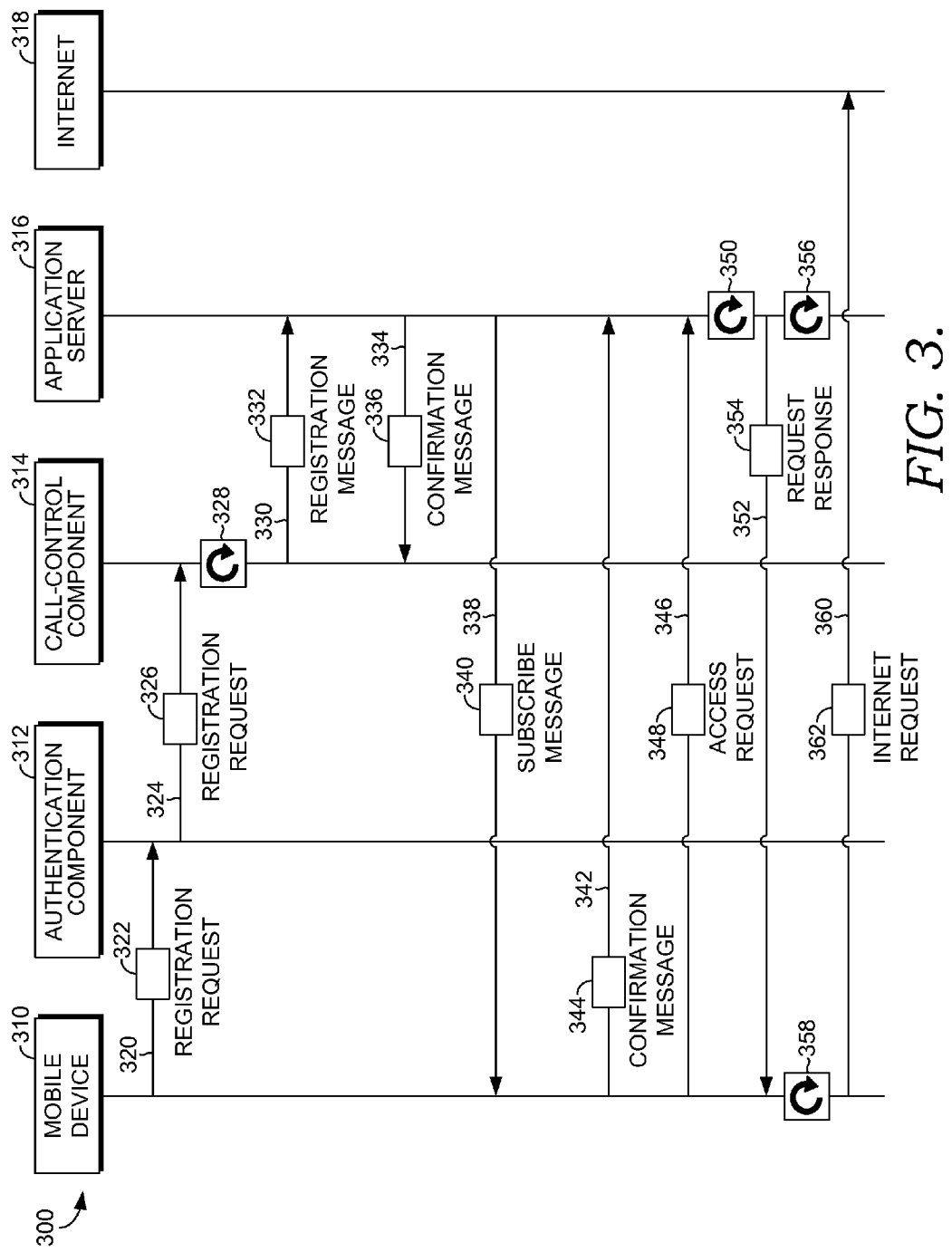
FIG. 3 depicts a flow diagram illustrating a method for tracking web page access information, in accordance with an embodiment of the present invention.

Referring now to FIG. 3, a flow diagram is shown illustrating a method for tracking website access information, in accordance with an embodiment of the present invention. Various components are depicted in FIG. 3. Embodiments for tracking website access information may include an array of devices or components, some of which are not shown so as to not obscure more relevant aspects of the invention. The components shown in FIG. 3 include a mobile device 310, a network-access gateway 312, a call-control component 314, an application server 316, and the Internet 318. The network-access gateway 312, in one embodiment, is or includes a PDSN. Although not shown, various other components may be subsumed within the network-access gateway 312, including a home agent (HA) and an AAA server. A home agent is a router on the mobile device's 210 home network that maintains information about the device's current location, and, in one embodiment, is identified in a care-of-address. This allows the mobile device 310 to keep the same IP address even when it connects from a different location. In one instance, the home agent works in conjunction with a foreign agent. The call-control component, in one embodiment, is a call session control function (CSCF), which is used to process SIP signaling packets in the IMS. There are multiple types of CSCFs, including a proxy-CSCF, a serving-CSCF, and an interrogating-CSCF.

Initially, the mobile device 310 authenticates and registers with the access network to which the mobile device 310 is connected. The access network, for example, may be WiMAX, 3G, 4G, 1 X, Femto, Bluetooth, Bluewave, etc. The mobile device 310 then communicates 320 a registration request 322 to the network-access gateway 312, which then communicates 324 the registration request 326 to the call-control component 314. The registration request, in one embodiment, is a SIP REGISTER message that is communicated to an IMS core network (e.g., by way of the network-access gateway 312 and the call-control component 314) with which the mobile device 310 is configured. The call-control component 314 authenticates the mobile device 310 at step 328. After successful registration, the call-control component 314 sends a confirmation message (not shown) back to the mobile device 310 indicating that the mobile device 310 is successfully registered with the network. The confirmation message, in one embodiment, is a 200 OK message. The call-control component 314 then communicates 330 the registration message 332 to the application server 316 (e.g., third-party registration). The application server 316 communicates 334 a confirmation message 336 (e.g., 200 OK message) to the call-control component 314 indicating that it has received the registration message 332.

The application server 316 communicates 338 a subscribe message 340 (e.g., SIP SUBSCRIBE) to the mobile device 310 through the core network (e.g., network-access gateway 312 and call-control component 314). A subscribe message may include, for instance, an expiration timer, which indicates an amount of time in which the application server 316 and the mobile device 310 have to store the subscription state and renew it. The purpose of the subscribe message is to notify the mobile device 310 to send the application server 316 a request prior to or simultaneous to the mobile device 310 attempting to access a particular web page. This allows the application server 316 to collect and store access data that can be aggregated and sold to various entities. One example of a subscribe message is illustrated in FIG. 7.

Once the subscribe message 340 is received by the mobile device 310, the mobile device 310 communicates 342 a confirmation message 344 (e.g., 200 OK message) back to the application server 316 confirming to the application server 316 that its subscription to the web application event has been activated, such that the mobile device 310 is aware that it is to send a request to the application server 316 prior to or simultaneous to attempting to access a web page. Once the user indicates a desire to access a web page (e.g., by entering a URL into a web browser), the mobile device 310 communicates 346 an access request 348 (e.g., SIP NOTIFY) to the application server 316. In one embodiment, the access request is an XML message that contains the HTTP link that the mobile device 310 is attempting to access.

As mentioned above, the application server 316 or an associated data store stores user profiles associated with each user provisioned on the application server 316. Based on one or more of the user profile, the date, the time, or the web page that the mobile device 310 is attempting to access, the application server 316 applies necessary policies to either allow the mobile device 310 to access the web page or reject the access request. This is determined at step 350. The application server 316 communicates 352 a request response 354, which indicates whether the access request is accepted or rejected. This request response 354, in one embodiment, is a 200 OK confirmation message, and may be a simple message summary type of message, whose content indicates whether the mobile device 310 is approved to access the requested web page. If the access request is approved, the application server 316 or a component therein may update a database to include the access data from this most recent transaction (e.g., that the mobile device 310 is allowed to access the requested web page). Updating the database, shown at step 356, may include adding the link associated with the web page to the database if the link is not already there, updating a counter by one, which indicates that the web page has been visited by the mobile device 310, and adding other access data including a time and day that the web page was accessed, a succession of links from which the web page was accessed, and whether or not the access request was approved or rejected. In one embodiment, the access data is added to a database whether or not the access request is approved or rejected. In another embodiment, the database is updated only if the access request is approved.

In one embodiment, when an access request is rejected, the application server 316 communicates, along with the request response 354, one or more reasons why the request is rejected. Typically, a rejection message contains nothing more than an indication that the request is rejected. Here, however, if the request is rejected based upon parental control settings stored in the user profile, for instance, the rejection message (e.g., included in the request response 354) may include a link to the web page (e.g., XML message) where the parental control settings can be viewed and accessed in the case that the user wants to change the existing settings. Or, if the user profile indicates that access to a particular web page is not allowed during the hours of 2:00-4:00 PM, the rejection may contain a link where the user can modify the access settings. In an alternate embodiment, the rejection message includes a rejection code that indicates to the user one or more reasons as to why the request is rejected.

At step 358, the mobile device 310 determines, based on the received request response 354, whether it will attempt to access the web page. If it determines that it will attempt to access the web page, such as if the request response 354 indicates that the access request 348 is allowed, the mobile device 310 communicates 360 an internet request 362 to the Internet 318, such as through a web server. Each time the user of the mobile device 310 wishes to access a new web page, it is determined whether the timer on the subscribe message 340 (e.g., SIP SUBSCRIBE) has expired. As mentioned, each subscribe message includes a timer. If the timer has not expired, the mobile device 310 needs only to complete the method described above in relation to FIG. 3 beginning with sending an access request to the application server 316, as described above in relation to the access request 348 communicated 346 to the application server 316. If, however, the time has expired, the mobile device 310 may be required to communicate a registration message to the application server 316 so that the application server 316 knows that the mobile device 310 is registered with the network. The application server 316 would then communicate a subscribe message to the device 310, and so on, as described above. While it has been described above that the mobile device 310 communicates data to various components, such as the network-access gateway 312, the call-control component 314, the application server 316, and the Internet 318 (e.g., via a web server), an application or client located on the mobile device 310 may actually be communicating the data in certain circumstances.

FIG. 4 illustrates a flowchart of a method 400 for tracking website access information, in accordance with an embodiment of the present invention. Initially, users of mobile devices in the communications network may be provisioned on an application server, which may perform the steps detailed below. Provisioning, in one embodiment, includes transferring a user profile for a particular user and other information associated with the mobile device and the user of the mobile device to the application server. A user profile, in one embodiment, includes parental control settings that indicate one or more of a first set of web pages that the user of the mobile device is allowed to access, a second set of web pages that the user of the mobile device is not allowed to access, or particular times of day during which the user of the mobile device is not allowed to access certain web pages.

An indication is received at step 410, such as a registration notification, indicating that the mobile device is registered with a communications network, such as a wireless communications network. In one embodiment, the network is an IMS network that has authenticated the mobile device on the IMS network. In one instance, the registration notification is received from a component of the IMS network, such as a call-control component. Prior to receiving the registration notification, a component in the IMS network, such as a subscriber server or the call-control component, authenticates the mobile device on the IMS network. Once the registration notification is received, the application server may communicate a confirmation message to the sending component of the registration notification (e.g., call-control component) indicating that the registration notification has been received.

At step 420, the mobile device is instructed to send an access request prior to accessing a web page. This instruction communicated to the mobile device is a subscribe message in one embodiment. The subscribe message may include one or more of a destination of the subscribe message, from where the subscribe message is sent, an identification associated with the mobile device, or an expiration timer, indicating a time when the call-control component must once again communicate a registration message to the application server. In response, the mobile device may communicate a confirmation message (e.g., 200 OK message) to the application server indicating that it will notify the application server prior to it accessing a web page. An access request, such as a SIP NOTIFY message, may be sent to an application server in one embodiment. The purpose of the access request is to request permission from the application server for the mobile device to access a particular web page. The access request may be sent prior to or simultaneous to the mobile device attempting to access the web page. At step 430, the access request is received, indicating that the mobile device is seeking approval to access the web page.

Based on a user profile associated with a user of the mobile device, the access request is approved at step 440 such that the mobile device is allowed to access the web page. Upon approving the access request, access data is collected, shown at step 450. The access data includes one or more of a date and time that the web page was accessed by the mobile device, a different web page from which the web page was accessed, demographic information associated with the user of the mobile device, or an identification associated with the mobile device. At step 460, the access data is stored in a database. Storing the access data may include, in one embodiment, updating a counter that keeps track of a number of times that each web page has been visited or accessed by the users.

Turning to FIG. 5 a flowchart is shown of another method 500 for tracking web page access information, in accordance with an embodiment of the present invention. At step 510, a request is received for a mobile device to access a web page. The request may be in the form of an indication to receive permission to access the web page. The request may be in the form of an access request whose body is an XML message. Further, the access request may include a link to the web page to which the mobile device is requesting access. It may be determined at step 520 whether the mobile device is allowed to access the web page. This determination may be based on user information. In one embodiment, user information includes a first set of web pages that the user of the mobile device is allowed to access, a second set of web pages that the user of the mobile device is not allowed to access, and/or particular times of day during which the user of the mobile device is not allowed to access certain web pages. Using this information, an algorithm may be used to apply policy to make this determination. User information, in one embodiment, is received by the application server by way of user input through a web interface. For instance, users may be able to login to a website and change settings associated with the user's mobile device, or even a family member's mobile device (e.g., parental controls).

If it is determined that the mobile device is allowed to access the web page, a confirmation message is communicated to the mobile device, shown at step 530, indicating that the mobile device is allowed to access the web page. At step 540, access data is collected. The access data, in one embodiment, includes one or more of a date and time that the web page is accessed by the mobile device, a different web page from which the web page was accessed, demographic information associated with the user of the mobile device, or an identification associated with the mobile device. A database may then be updated with the access data at step 550. The database is updated each time the mobile device receives permission to access a web page. In one embodiment, the database includes a counter that monitors a quantity of instances that the web page is accessed by various users. Each time a particular web page is accessed, the counter is incremented by one, indicating that the web page has been accessed one more time.

If it is determined that the mobile device is not allowed to access the web page, a rejection message is communicated to the mobile device at step 560 that indicates one or more reasons for not allowing the mobile device to access the web page. In one embodiment, the rejection message includes a web page link that directs the user to a website that allows the user to modify settings associated with access to the web page, such as user preferences settings.

Figure 6:
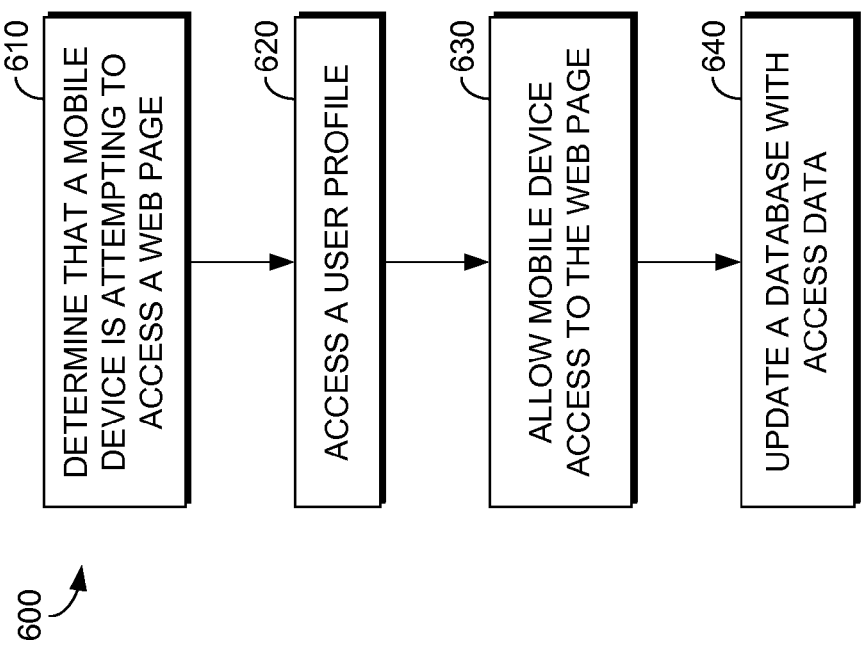

Referring to FIG. 6, a flowchart is illustrated of another method 600 for tracking web page access information, in accordance with an embodiment of the present invention. It is initially determined at step 610 that a mobile device is attempting to access a first web page. A user profile is accessed at step 620. The user profile may be personalized for the particular user, and may include information that the application server can use to determine whether or not to allow the mobile device access to the web page. For instance, the user profile may indicate certain web pages that the user is or is not allowed to access for various reasons. The user profile may also indicate times of the day when the user is or is not allowed to access these web pages. This may be for parental control reasons.

At step 630, it is determined that the mobile device is allowed to access the first web page based on the user profile. In addition to the user profile, a time and date of the attempt to access the web page and a subject matter associated with the first web page may be used to make the determination. For instance, web pages that are directed to obscene or adult material may be strictly prohibited from being accessed by a user under the age of 18. A database is then updated with access data at step 640. The database may include a counter that is used to maintain a record of a quantity of instances that various web pages have been accessed. The access data corresponds to the mobile device accessing the first web page. In one embodiment, updating the database includes collecting access data upon allowing access to the first web page. The access data may include one or more of a plurality of web page links, a total quantity of times that users have selected each of the web page links, a second web page from which the first web page was accessed, or user information associated with each user who has accessed any of the web page links listed in the database. In addition to collecting access data, a counter may be increased to keep track or monitor a quantity of times that the web page and other web pages have been accessed. Further, a second web page from which the first web page was accessed is identified. In one instance, more than one web pages are identified from which the first web page was accessed, such as if the user came upon the first web page after visiting a series of web pages.

In one embodiment, it is determined that the mobile device is attempting to access a third web page. It is verified that a subscription timer has not expired, such that the mobile device does not need to resend a registration message to the application server. It is determined that the mobile device is allowed to access the third web page. Access data is then collected such that the database can be updated with this information that corresponds to the mobile device accessing the third web page.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method of tracking data corresponding to a mobile device accessing a web page, the method comprising:
 receiving a SIP registration notification indicating that a mobile device is registered with a wireless communications network, wherein the wireless communication network comprises the wireless device, an application server, and a gateway;
 instructing the mobile device by the application server to return an access request prior to attempting to access a web page, wherein the instruction comprises a SIP subscribe message with an expiration timer communicated to the wireless device via the gateway;
 receiving by the application server from the mobile device the access request indicating that the mobile device is seeking approval to access the web page, wherein the wireless device transmits the access request based on the SIP subscribe message from the application server;
 based on a user profile on the application server and associated with a user of the mobile device, approving the access request by the application server using an algorithm such that the mobile device is allowed to access the web page;
 upon approving the access request, collecting access data in a reporting log at the application server, wherein the access data includes,
   (1) a date and time that the web page was accessed by the mobile device,
   (2) a web page stream comprising a sequence of one or more web pages from which the web page was accessed,
   (3) a process counter to track a number of times that a particular web page is accessed,
   (4) demographic information associated with the user of the mobile device, and
   (5) an identification associated with the mobile device; and
 storing the access data in a database, and
 sending a notification comprising at least a portion of the reporting log when a flagged web site is accessed.

2. The computer-readable media of claim 1, wherein the communications network is an Internet Protocol (IP) Multimedia System (IMS) network.

3. The computer-readable media of claim 2, wherein the registration notification is received from a component in the IMS network that has authenticated the mobile device on the IMS network.

4. The computer-readable media of claim 1, wherein instructing the mobile device to return the access request further comprises communicating a subscribe message to the mobile device, the subscribe message including one or more of,
 (1) a destination of the subscribe message,
 (2) from where the subscribe message is sent,
 (3) an identification associated with the mobile device, or
 (4) an expiration timer.

5. The computer-readable media of claim 1, wherein the mobile device communicates a confirmation message confirming that it will request permission to access the web page.

6. The computer-readable media of claim 1, further comprising receiving the user profile and other information associated with the mobile device and the user of the mobile device.

7. The computer-readable media of claim 1, wherein the user profile includes parental control settings that indicate one or more of,
 (1) a first set of web pages that the user of the mobile device is allowed to access,
 (2) a second set of web pages that the user of the mobile device is not allowed to access, or
 (3) particular times of day that the user of the mobile device is not allowed to access certain web pages.

8. The method of claim 1, further comprising:
 providing the wireless device a location independent IP address using a mobile agent such that the wireless device maintains the IP address independent of location when connected to the communications network.

9. The method of claim 1, wherein the mobile device transmits the access request based on the expiration timer of the SIP subscribe message.

10. Non-transitory computer-readable media having computer-executable instructions embodied thereon that, when executed, facilitate a method of tracking web page access information, the method comprising:
 instructing a mobile device by an application server to return an access request prior to attempting to access a web page, wherein the instruction comprises a SIP subscribe message with an expiration timer;
 receiving at the application server an indication that the mobile device is requesting permission to access a web page, wherein the wireless device transmits the access request based on the SIP subscribe message from the application server;
 determining by the application server, based on user information, whether the mobile device is allowed to access the web page using an algorithm;
 if it is determined that the mobile device is allowed to access the web page,
   (1) communicating by the application server a request response to the mobile device indicating that the mobile device is allowed to access the web page,
   (2) collecting by the application server access data in a reporting log that includes a date and time that the web page is accessed by the mobile device, a web page stream comprising a sequence of one or more web pages from which the web page is accessed, a process counter to track a number of times that a particular web page is accessed, demographic information associated with the user of the mobile device, or an identification associated with the mobile device,
   (3) updating by the application server a database with the access data, wherein the database is updated each time the mobile device receives permission to access any one of a plurality of web pages, and
   (4) sending a notification comprising at least a portion of the reporting log when a flagged web site is accessed; and
 if it is determined that the mobile device is not allowed to access the web page, communicating by the application server a rejection message that indicates one or more reasons for not allowing the mobile device to access the web page.

11. The computer-readable media of claim 10, wherein the one or more reasons for not allowing the mobile device to access the web page include a web page link that allows the user to modify settings associated with access to the web page.

12. The computer-readable media of claim 10, wherein the indication that the mobile device is requesting permission to access the web page is an access request whose body is an Extensible Markup Language (XML) message.

13. The computer-readable media of claim 10, wherein the database includes a counter that monitors a quantity of instances that the web page is accessed.

14. The computer-readable media of claim 10, further comprising receiving the user information by way of user input through a web interface.

15. The computer-readable media of claim 10, wherein the user information includes one or more of,
   (1) a first set of web pages that the user of the mobile device is allowed to access,
   (2) a second set of web pages that the user of the mobile device is not allowed to access, or
   (3) particular times of day that the user of the mobile device IS not allowed to access certain web pages.

16. Non-transitory computer-readable media having computer-executable instructions embodied thereon that, when executed, facilitate a method of tracking web page access information, the method comprising:
   instructing a mobile device by an application server to return an access request prior to attempting to access a web page, wherein the instruction comprises a SIP subscribe message with an expiration timer;
   receiving at the application server an indication that the mobile device is requesting permission to access a web page, wherein the wireless device transmits the access request based on the SIP subscribe message from the application server;
   accessing by the application server a user profile associated with a user of the mobile device;
   determining by the application server that the mobile device is allowed to access the first web page based on the user profile, a time and date of the attempt by the mobile device to access the first web page, and subject matter associated with the first web page, wherein the application servers makes the determination using an algorithm; and
   updating by the application server a database comprising access data in a reporting log corresponding to the mobile device accessing the first web page, wherein the updating includes,
      (1) upon allowing access to the first web page, collecting the access data,
      (2) increasing a counter that keeps track of a quantity of times the web page has been accessed,
      (3) identifying a second web page from which the first web page was accessed, and
      (4) sending a notification comprising at least a portion of the reporting log when a flagged web site is accessed.

17. The computer-readable media of claim 16, wherein the database maintains a record of a quantity of instances that various web pages have been accessed.

18. The computer-readable media of claim 16, wherein the access data includes one or more of a plurality of web page links, a total quantity of times that users have selected each of the web page links, the second web page from which the first web page was accessed, or user information associated with each user who has accessed one or more of a plurality of web page links listed in the database.

19. The computer-readable media of claim 16, further comprising:
   determining that the mobile device is attempting to access a third web page;
   verifying that a subscription timer has not expired, such that the mobile device does not need to renew its registration;
   determining that the mobile device is allowed to access the third web page; and
   updating the database with the access data corresponding to the mobile device accessing the third web page.

* * * * *